United States Patent [19]
Ott

[11] 3,902,691
[45] Sept. 2, 1975

[54] AUTOMATIC VEHICLE SUSPENSION SYSTEM

[76] Inventor: Owen J. Ott, Rt. 25, Brookfield Center, Conn. 06805

[22] Filed: Nov. 27, 1973

[21] Appl. No.: 419,415

[52] U.S. Cl............... 246/167 R; 105/171; 280/6 H
[51] Int. Cl.² .......................................... B61L 3/06
[58] Field of Search .................... 246/167 R, 187 B; 280/112 A, 6 R, 6.1, DIG. 1, 6 H; 104/1 R, 18, 149; 105/171, 164, 149, 194, 185, 209

[56] References Cited
UNITED STATES PATENTS

| | | | |
|---|---|---|---|
| 3,218,455 | 11/1965 | Hughson | 246/187 B |
| 3,778,081 | 12/1973 | Takahashi | 280/6 H |
| 3,783,796 | 1/1974 | Kreissig | 105/171 |
| 3,831,969 | 8/1974 | Lindblom | 280/6 H |

FOREIGN PATENTS OR APPLICATIONS

| | | | |
|---|---|---|---|
| 964,974 | 7/1964 | United Kingdom | 246/187 B |

Primary Examiner—Lloyd L. King
Assistant Examiner—Reinhard J. Eisenzopf
Attorney, Agent, or Firm—Weingarten, Maxham & Schurgin

[57] ABSTRACT

A system for the automatic control of the characteristics of the suspension system of railway or other vehicles in accordance with actual conditions of the track or other path over which the vehicle is moving. Data sources are provided at intervals alongside a track, each data source being sensible by apparatus on board a train moving past the source to provide an output representation of the condition of the track and roadbed along a predetermined portion of the way. Control signals are derived for adjusting the characteristics of the vehicle suspension system to provide efficient travel over the particular pathway.

6 Claims, 3 Drawing Figures

AUTOMATIC VEHICLE SUSPENSION SYSTEM

FIELD OF THE INVENTION

This invention relates to railway control systems and more particularly to a system for automatic control of vehicle body suspension systems in accordance with track conditions.

BACKGROUND OF THE INVENTION

Imperfections in existing roadbeds and trackage of the nation's railroad network are a major limiting factor in providing an efficient and reasonably priced high speed rail transportation system. Track conditions vary widely in quality, and rolling stock must be designed to accommodate the worst encounterable track conditions. Stiff suspensions in the lateral and vertical axes of a railroad vehicle are usually employed to control vehicle motion. However, variations in track geometry and characteristics can cause small amplitude motions of often severe force resulting in poor riding quality to the detriment of freight being carried or the discomfort of passengers. The impact of these spurious motions induced by track conditions can be reduced by the use of a softer or more compliant suspension but such suspensions are subject to lower frequency larger amplitude perturbations which can cause substantial misalignment of the vehicle relative to the desired course of travel, especially over curved courses, such that the motion of the vehicle on the track can become unstable and can cause derailment.

Furthermore, in negotiating sharp curves, vehicle speed must often be reduced to prevent severe discomfort to passengers and damage to freight due to the acting centrifugal forces. This necessity for speed reduction on such curves can be obviated by rotating the vehicle body with respect to the track following member. Clearly no single position of the vehicle relative to the track can be suitable for all conditions.

SUMMARY OF THE INVENTION

In accordance with the present invention, the suspension characteristics of railway vehicles are controlled in accordance with actual conditions along the track travel path such that the most effective riding characteristics are provided to suit actual track conditions. Thus, along ways in which track conditions are relatively good the suspension system behaves as a "soft" conventional system would, to provide an extremely comfortable and cushioned ride. However, along those stretches of track having sharp curves, dips, or bumps, the suspension system, having knowledge of these conditions, suitably adjusts the linkage elements between the track following members and the vehicle body, to provide the best possible ride under the conditions. The disposition of the vehicle relative to the track is also determined to compensate for track curvature and superelevation.

In typical embodiment a trackside data source is provided at selected intervals along the pathway and these sources can be of a variety of forms to suit particular system requirements. For example, a coded label can be provided along the track which is sensed to provide an output signal respresentative of the coded track condition data. Such data includes information on curvature, track roughness, switch positions and the like and this data is read into a memory carried by the car and is read out as required under the command of distance measuring equipment also carried aboard the vehicle. The suspension system is programmed in accordance with both the track information derived from the trackside data source and the measured speed and location of the train. The suspension system is controlled by adjusting the spring or damping rates along one or more axes and by adding superelevation to the vehicle cabin position for increased comfort. By use of the invention trains can be operated at faster speeds over unimproved trackage and the smoothest possible ride can be provided in direct relationship to actual track conditions rather than providing a compromise riding characteristic based on track conditions presumed to be encountered. The invention also provides less wear on rails and wheels since the dynamic loads are reduced by the less rigid coupling of the vehicle to the tracks.

DESCRIPTION OF THE DRAWINGS

The invention will be more fully understood by reference to the following detailed description when taken in conjunction with the drawing in which.

DETAILED DESCRIPTION OF THE INVENTION

Figure 1:
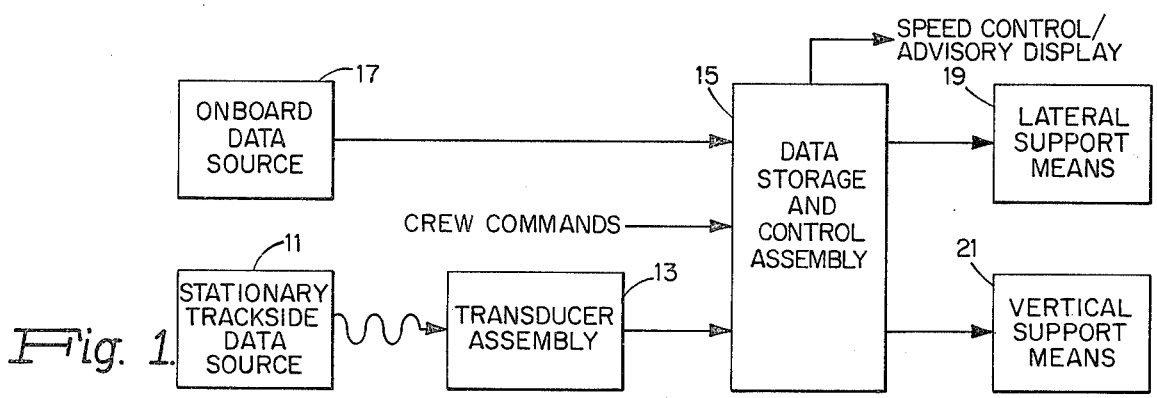
FIG. 1 is a block diagram of an automatic vehicle suspension system according to the present invention.

An automatic vehicle suspension system according to the invention is shown in FIG. 1. The invention will be described hereinafter with particular reference to an embodiment suitable for railroad vehicle suspensions. The description of the invention in terms of a suspension system suitable for railway vehicles is by means of illustration and does not constitute limitation of the invention to applications involving tracked pathways. The invention can be applied to monorail vehicles, air cushion vehicles, or any vehicles travelling on a prepared pathway.

Referring to FIG. 1, a stationary trackside data source 11, containing information indicating the condition and configuration of the pathway lying ahead is interrogated by a transducer assembly 13 on board a moving vehicle. The coded information from data source 11 is communicated by means of transducer 13 to data storage and control assembly 15 on board the vehicle. Control assembly 15 can also receive coded information from an on board data source 17, which typically indicates the position, speed, and acceleration of the moving vehicle along the path of travel, and from crew commands. On board data source 17 may also provide information indicating the disposition and motion of the vehicle body with respect to the track following members, such as sway and vibration.

Control assembly 15 contains logic circuitry which is operative in response to the path condition information received from data source 11, as well as the current dynamic information received from on board data source 17, to provide electrical control signals to lateral adjustably compliant support means 19 and vertical adjustably compliant support means 21. Control assembly 15 may also provide speed control signals directly to the speed control system and advisory information to a suitable display in the operator's control area. The support means 19 and 21 are part of the suspension system of the vehicle body which couples the body to the track following members.

Stationary trackside data source 11 is typically a label disposed along the trackside and having coded indicia thereon sensible by transducer 13. Alternatively, trackside data source 11 may contain a transmitter which is triggered to transmit coded information by the passage of the vehicle. Any other suitable means of communication may also be employed, and transducer 13 can be either active or passive. Typically, the trackside data source 11 will contain information indicating the roughness, curvature, superelevation, and permissible vehicle deviations from the trackage path together with an indication of the distance forward from the data source at which the particular conditions occur. Trackside data source 11 may also contain dynamic sensors to indicate the speed and acceleration of a moving vehicle.

Control assembly 15 may be programmed to respond only to the coded information from data source 11 or, alternatively, it may receive instructions from source 11 and source 17 or crew commands manually entered by the train crew. The coded information communications link between trackside data source 11 and control assembly 15 can contain error detecting means which may take a number of well known forms. For example, the coded information provided by the trackside data source 11 can contain error correcting bits.

Since control assembly 15 receives coded information regarding future trackside conditions from stationary data source 11 only intermittently and not continuously, the control assembly must include a memory sufficient to contain information relative to trackage condition intermediate trackside data sources. As an additional safety measure, the information provided by each trackside data source may overlap that provided by a succeeding data source in order to provide sufficient coded information to govern the suspension system in the event that the coded information message from a succeeding trackside data source is garbled or defective. As an additional safety measure the memory in control assembly 15 may be programmed to provide an indication to the operating crew in the event that accurate information is not received from the trackside data sources.

The control assembly 15 may be further programmed to compare the dynamic conditions sensed by on board data source 17 with the conditions predicted by trackside data source 11 to provide a further check on the correctness of the communication between trackside data source 11 and control assembly 15.

Lateral and vertical adjustably compliant support means 19 and 21 govern the coupling, damping, and positioning of the vehicle body to the vehicle track following members. Support means 19 and 21 may be mechanically, electrically, or hydraulically operative, or alternatively may employ a combination of hydraulic, electrical and mechanical components.

Lateral support means 19 determines the lateral positioning, coupling and damping of the vehicle body to the track following members in response to control signals from control 15. Such control signals might be employed to displace the vehicle body while passing through a station at high speed, to avoid striking the platform. Vertical support means 21 determines the coupling and damping in the vertical directions between the vehicle body and the track following members as well as the positional biasing of one side of the vehicle relative to the other, such as tilting the vehicle body sideways or raising one end of the vehicle relative to the other.

Figure 2:
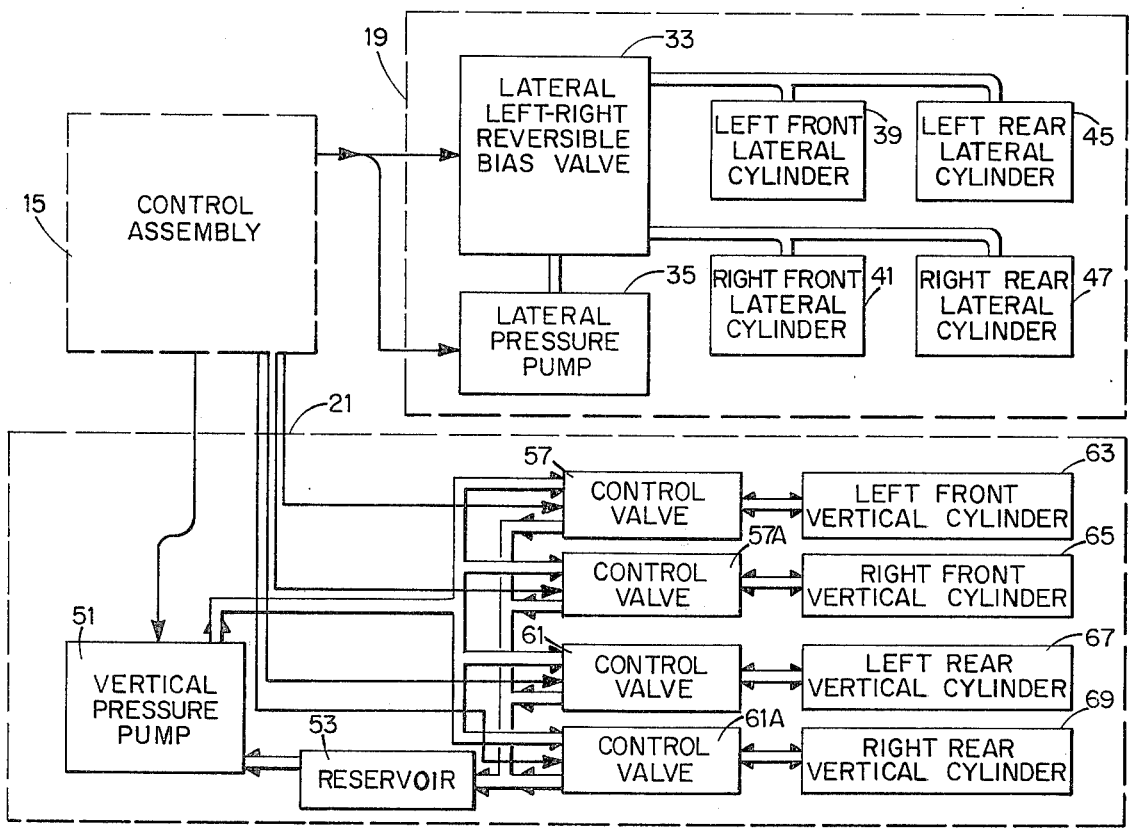
FIG. 2 is a block diagram of an adjustably compliant vehicle support system according to the invention.

In order that the operation of the invention may be more fully understood, the operation of a typical hydraulically operated adjustable compliant support means is discussed below, with reference to FIG. 2. In a hydraulic coupling system, lateral support means 19 comprises a typically electrically operated lateral left-right reversible bias valve 33 and lateral pressure pump 35 which operate left and right front lateral hydraulic cylinders 39 and 41 and left and right rear lateral hydraulic cylinders 45 and 47. Vertical support means 21 comprises electrically operated vertical pressure pump 51, reservoir 53, front control valves 57 and 57A and rear control valves 61 and 61A which are hydraulically coupled to left and right front vertical hydraulic cylinders 63 and 65 and rear vertical hydraulic cylinders 67 and 69, respectively.

Figure 3:
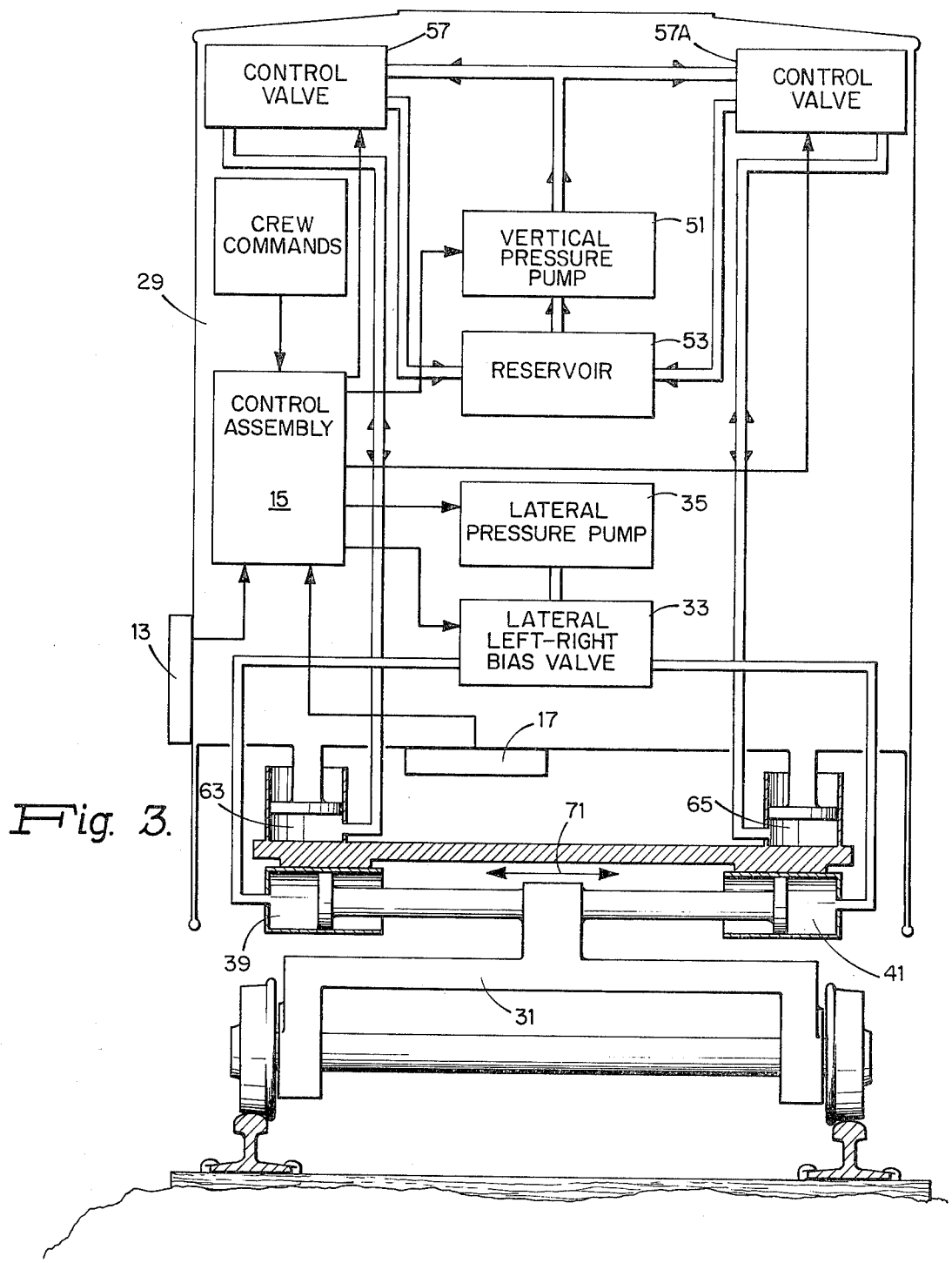
FIG. 3 is a part schematic, part pictorial representation of the vehicle suspension system of FIG. 2 connected to one set of track following members.

The deployment and operation of lateral and vertical support means 19 and 21 is illustrated in FIG. 3 which shows the apparatus at one end of a typical vehicle. The vehicle body is shown generally at 29 and the track following member is indicated at 31. Control assembly 15 receives coded information from on board data source 17 which may be positioned either on the vehicle body or on the track following member, interrogation assembly 13, and crew commands and provides an electrical signal to actuate electrically operative lateral reversible bias valve 33 which determines the direction of pumping, and thus determines the amount of hydraulic fluid in left and right front hydraulic cylinders 39 and 41. Since cylinders 39 and 41 are fixed laterally with respect to the vehicle body 29, and the pistons in cylinders 39 and 41 are fixed to the track following member 31, a change in the amount of hydraulic fluid in cylinder 39 relative to the amount of hydraulic fluid in cylinder 41 or vice-versa causes a change in the lateral displacement of the vehicle body 29 with respect to the track following member 31 as indicated by arrows 71.

Electrically operative lateral pressure pump 35 also receives actuating control signals from control assembly 15 and operates on the entire hydraulic system comprising the lateral support means 19 to determine the elasticity of the system. The elasticity of the lateral hydraulic system is determinative of the tightness of coupling, that is, the spring rate of travel of the pistons in cylinders 39, 41, 45 and 47 as well as the damping, or the viscous resistance to piston motion, in the cylinders.

Vertical pressure pump 51 similarly governs the hydraulic pressure in hydraulic cylinders 63–69 including cylinders 63 and 65 in the front of the vehicle shown in FIG. 3. By controlling the flow between these cylinders, vertical pressure pump 51 determines the tightness of coupling and the amount of damping in the vertical suspension system comprising hydraulic valves 63–69.

Front valves 57 and 57A determine the amount of hydraulic fluid in cylinders 63 and 65 which in turn determine the piston height in those cylinders and thus determine the left-right vertical orientation of the vehicle at its front end. Similarly, rear valves 61 and 61A shown in FIG. 2 govern hydraulic cylinders 67 and 69, responding to equivalent electrical signals in the same way so as to provide left-right biasing at both the front and rear portions of the vehicle.

The automatic suspension system according to the invention as described above operates generally in the following manner: For vehicle travel over generally straight even trackage, the fluid flow in both lateral and vertical suspension systems is restricted slightly to provide relatively loose coupling between the vehicle body and the track following members. For travel over poor quality trackage which is less uniform in both vertical and lateral dimensions, the pressure in both the vertical and lateral suspension systems is dynamically adjusted to compensate for minor track errors, while the system elasticity and damping are adjusted to optimize the vehicle riding qualities. Similarly, as the vehicle negotiates a curve, left and right cylinder pressures are adjusted to tilt the vehicle body 29 relative to track following members 31, compensating for centrifugal forces acting radially. Likewise, adjustments in the vertical displacement of the ends of the vehicle may be made in order to compensate for rises and falls in the vertical dimension of the tracked pathway.

The control assembly 15 assimilates information from stationary trackside data sources which contain pre-coded information regarding general quality of the track, curvature, and superelevation and from the on board sensor which indicates vehicle position, speed, and acceleration. The on board sensor may also have an important additional function, to indicate vehicle motion such as lateral swaying or other resonances which is either not adequately predicted by coded data from the stationary track sources or which has not been adequately compensated for by the system. Therefore, data from the on board data source may be employed by the control assembly 15 as a correction device to update coded signals to adjustably compliant vehicle support system or to sharply reduce speed and shut the system down in the event of failure. Crew commands may either be directed to the control assembly 15 or alternatively directly to the adjustably compliant suspension systems by means of electrical connections to the various bias valves and pressure pumps. Thus, a fail-safe system is provided whereby actual dynamic data sensed by the vehicle serves to correct pre-coded and predetermined data received from an external source and in which crew commands may further correct or even manually determine the operation of the adjustably compliant suspension system.

In one embodiment of the invention, the complete on board system including transducer assembly 13 and control assembly 15 as well as the bias valves and pressure pumps may be provided in each of the railroad vehicles which makes up a typical train. Alternatively, only a single vehicle, or a plurality of vehicles distributed along the length of the train may be provided with a transducer assembly, data storage and control assembly, valves and pumps for controlling the suspension of all the vehicles in a train by suitable hydraulic connections. In a further alternative the various pumps and valves may be provided on each vehicle while the transducer assembly and control assembly are provided only on a limited number of vehicles for controlling the suspension of all the vehicles by appropriate electrical connections.

The benefit accruing to the user of the invention is the ability automatically to match the vehicle suspension to the track conditions. By varying the suspension to suit the track conditions, the speed of vehicle operation can be maximized while minimizing the disturbance caused by trackage imperfections and consequent injury and discomfort to goods or passengers carried by the vehicle, and minimizing wear on trackage and track following members due to high dynamic loads resulting from track roughness.

The foregoing description has dealt with purely hydraulic suspension systems. It is apparent that similar controls from control assembly 15 could be employed to govern an equivalent mechanical suspension system or a combined electrical-hydraulic-mechanical suspension system. Undoubtedly, many variations on the configurations on the controls shown herein will occur to those versed in the art. It is not intended therefore to limit the present invention to the precise embodiments and arrangements of controls described herein; the invention is limited only by the claims which follow.

What is claimed is:

1. A system for the automatic control of the suspension characteristics of the support means of a vehicle traveling along a prepared pathway, said system comprising:

an adjustable vehicle support means operative in response to control signals to adjustably couple the body of said vehicle to the path following members of said vehicle to selectively permit adjustment of the lateral position, vertical position and tilt of said body in relation to said path following members;

at least one data source disposed along said pathway and operative to provide coded information representative of the condition of said pathway lying ahead of said data source;

communication means operative to receive coded information from said at least one data source; and control means on board said vehicle and operative in response to said coded information to provide control signals for said vehicle support means to cause adjustment of said suspension characteristics in accordance with the condition of said pathway as represented by said at least one data source.

2. A system according to claim 1 wherein said vehicle support means includes a lateral adjustably compliant support means and vertical adjustably compliant support means for adjustably coupling said vehicle body to said path following members;

said lateral support means being operative to adjust the lateral positioning, coupling and damping of said vehicle body with respect to said path following members in response to control signals from said control means;

said vertical support means being operative to adjust the vertical positioning, coupling and damping of said vehicle body with respect to said path following members in response to control signals from said control means.

3. A system according to claim 2 wherein said control means is operative to decode said information from said data source and provide control signals for both said lateral and vertical support means to respectively adjust the lateral and vertical compliance thereof to achieve optimum riding characteristics under actual pathway conditions as represented by said data source.

4. A system according to claim 1 wherein at least one data source includes a plurality of similar data sources disposed in respective selected positions along said pathway and each operative to provide coded information representative of the condition of a respective section of said pathway.

5. A system according to claim 1 wherein said vehicle is a railway vehicle and said prepared pathway is a railway track along which said railway vehicle travels.

6. For use with a railway vehicle traveling along a track having predetermined track conditions along a travel path, a system for the automatic control of the suspension characteristics of the support means of said vehicle, said system comprising:

an adjustable vehicle support means operative in response to control signals to adjustably couple the body of said vehicle to the wheels of said vehicle to selectively permit adjustment of the lateral position, vertical position and tilt of said body in relation to said wheels;

a plurality of data sources disposed along said track at respective predetermined positions and each operative to provide coded information representative of the condition of a predetermined section of said track lying ahead of said source;

communication means on board said vehicle and operative to receive coded information from each of said data sources upon passage by said vehicle past said respective data sources; and control means on board said vehicle and operative in response to said received coded information to provide control signals for said vehicle support means to cause adjustment of said suspension characteristics in accordance with the condition of said track as represented by said data sources to thereby achieve optimum riding characteristics under actual track conditions as represented by said data source.

* * * * *